Patented June 12, 1923.

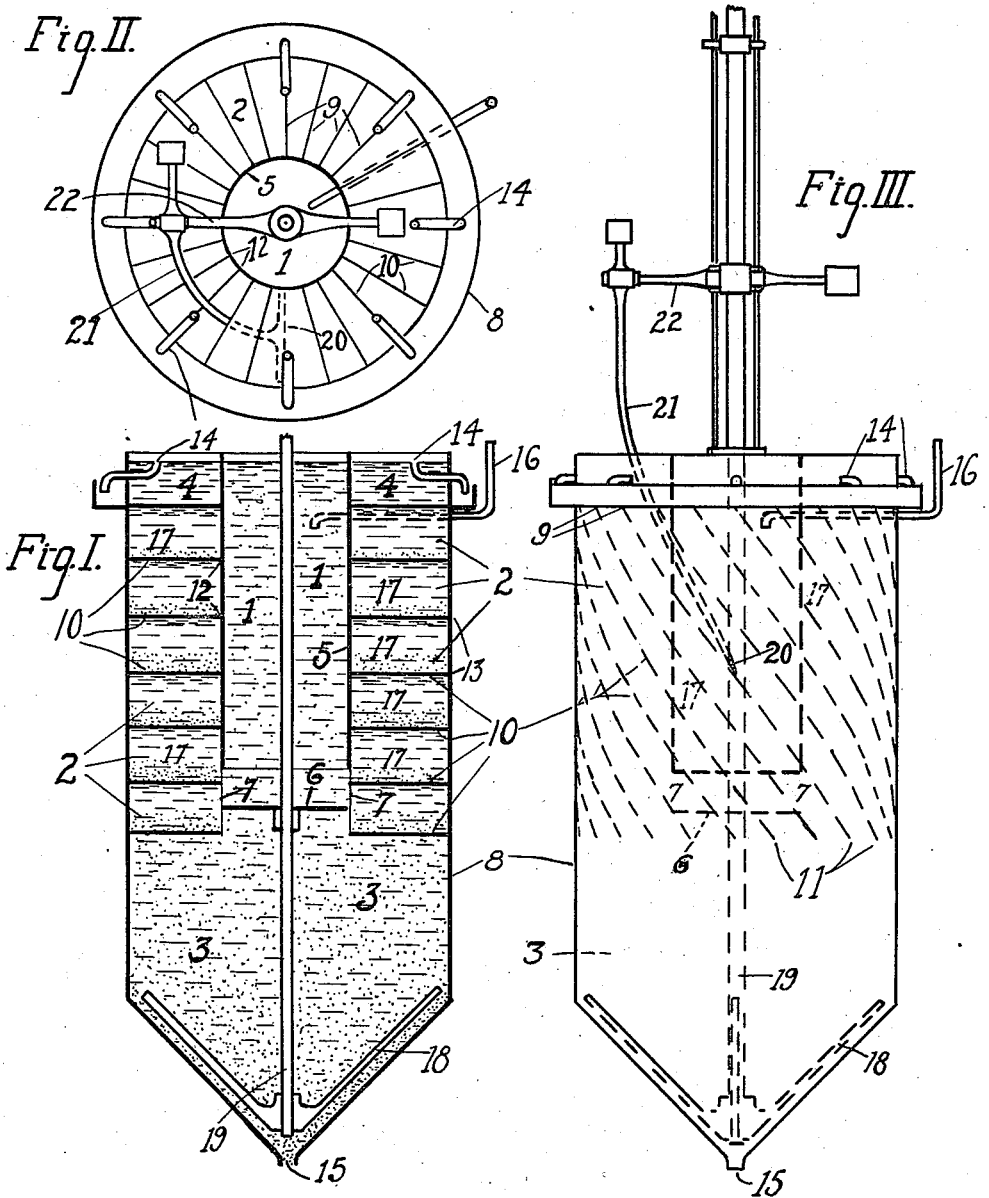

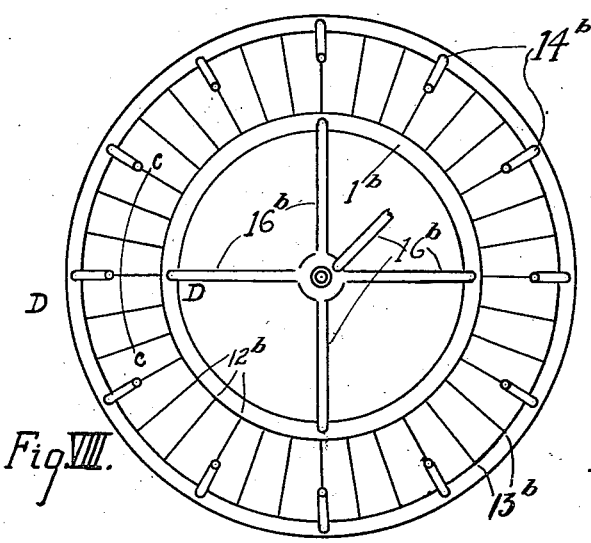
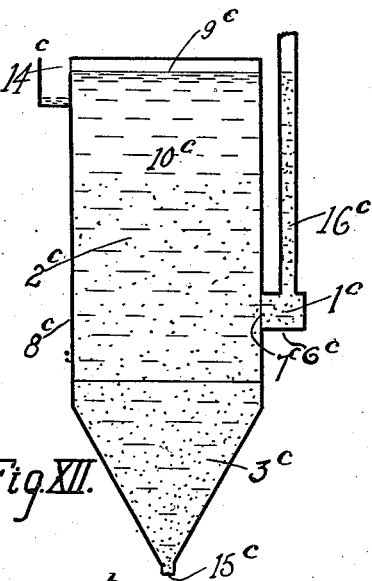
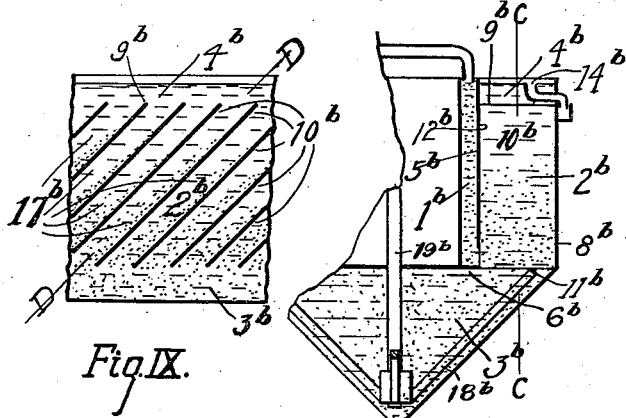
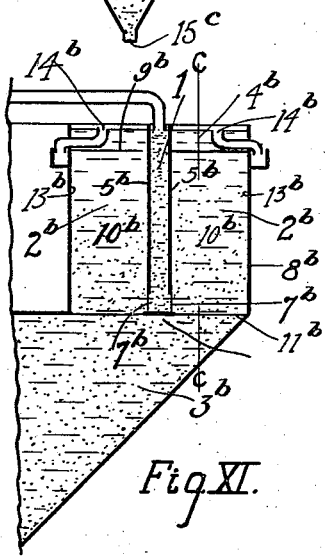

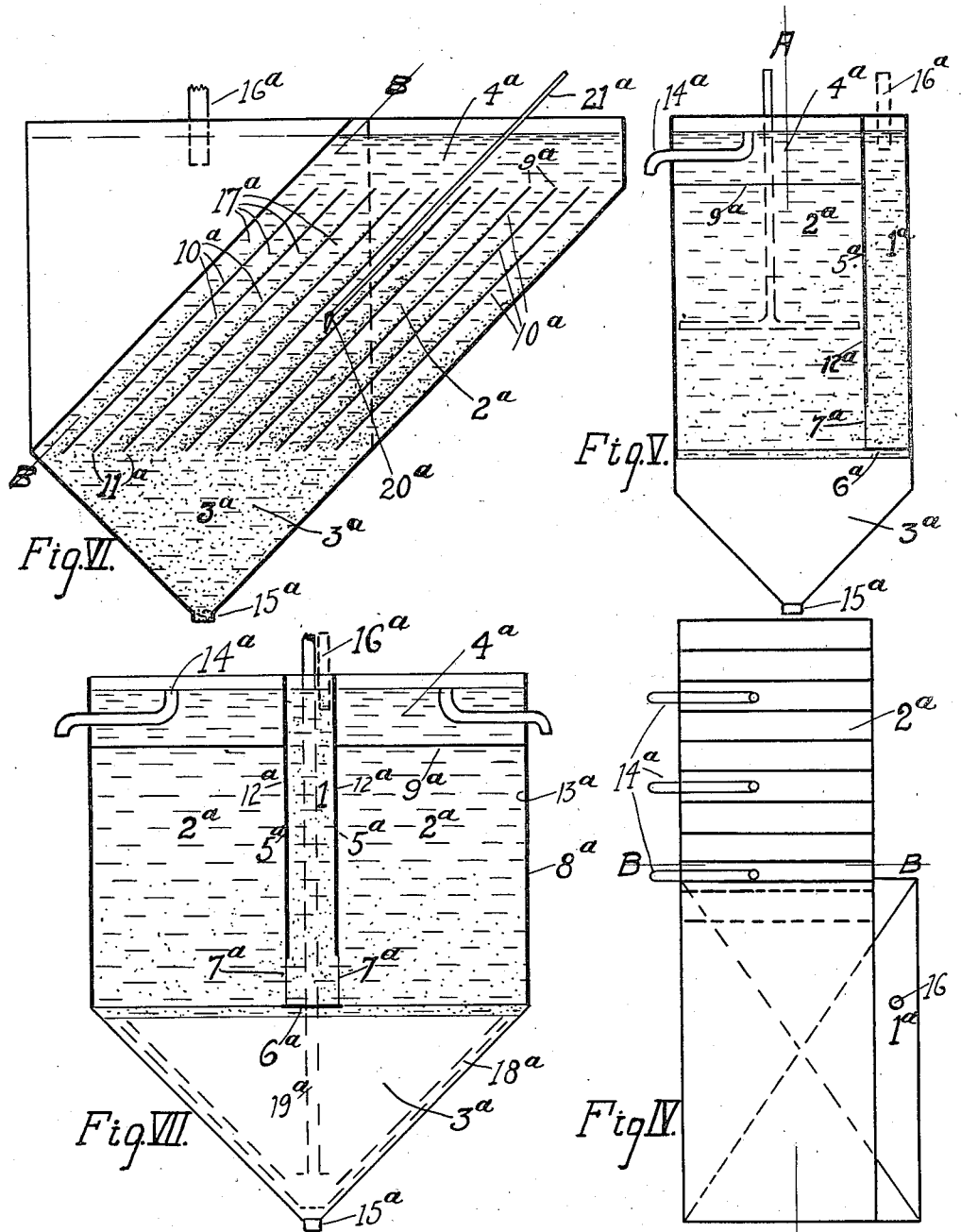

1,458,805

UNITED STATES PATENT OFFICE.

NIELS C. CHRISTENSEN, OF SALT LAKE CITY, UTAH.

APPARATUS FOR THE SETTLEMENT OF SOLID PARTICLES SUSPENDED IN LIQUIDS.

Application filed December 13, 1920. Serial No. 430,244.

*To all whom it may concern:*

Be it known that I, NIELS C. CHRISTENSEN, a citizen of the United States, residing at Salt Lake City, in the county of Salt Lake and State of Utah, have invented certain new and useful Apparatus for the Settlement of Solid Particles Suspended in Liquids, of which the following is a specification.

This invention relates to apparatus for the gravity settlement of finely divided solids out of suspension in liquids. It relates particularly to apparatus in which the settling area is increased by the introduction of a number of settling surfaces into the settling space to secure greater settling capacity in a limited volume.

The fact that the settling capacity of any apparatus of limited volume might be largely increased by the subdivision of this volume into a number of separate settling areas has long been common knowledge, but the main difficulties in the use of this principle in the settlement of slimes (slowly settling solids) out of suspension in liquids, have been in the securing of a uniform flow of pulp to all the settling spaces and in the securing of uniform separate outflows of relatively clear liquid and settled or thickened pulp from each of these settling spaces, and at the same time preventing the mixture of the outflowing thickened or relatively concentrated pulp and the inflowing relatively dilute pulp.

In the apparatus of this type now in common use these difficulties have been overcome by the use of controlled individual inlet headers and controlled individual outlets for both thickened pulp and clear solution. This arrangement is necessarily relatively complicated and cumbersome if the apparatus is divided into a large number of settling compartments, as this really amounts to merely duplicating a single type of machine in a limited space by cutting down the volume of each individual machine and combining the number in one apparatus. The great theoretical advantage of the increased number of settling surfaces cannot therefore, be secured in this type of apparatus.

Another great disadvantage of the apparatus of this type now commonly used is that the similar settling areas in the apparatus are superimposed one above another so that it is necessary to employ mechanical devices to move the settled material to the discharge openings. This results in cumbersome mechanical complications and prevents the use of any considerable number of separate settling areas in the same apparatus.

From the foregoing it will be apparent that the theoretical advantages of the use of a number of settling surfaces in a settling apparatus have not been secured in the forms of apparatus now in common use.

It is the object of my invention to secure these theoretical advantages by much simpler means than now used, and I do so by an entirely new method of installation of the settling planes by means of which all necessity for individual and controlled inlet and outlet connections to separate settling spaces is obviated and mechanical moving of the settled slimes is rendered unnecessary. By this new method I am enabled to secure a very much greater settling area or settling capacity in the same space than has hitherto been possible and am also enabled to do away with mechanical movement of the thickened pulp. In my invention I secure a substantially uniform inflow of the relatively dilute pulp to each settling area, and a substantially uniform outflow of clear solution and thickened pulp from each settling area without any interference of these different fluids with each other, and these results are secured without the use of any special controlled individual headers or other devices, such as are a necessity in the forms of settling apparatus now used, and by very simple means in a simple form of settling tanks.

These advantages are secured in my invention by the particular manner of installation in a tank of a number of similar sloping surfaces which surfaces divide the settling part of the tank into similar settling regions in which the clear solution is separated from the thickened pulp or settled material, in a form of arrangement which is entirely different to the superimposed settling surfaces and spaces found in the forms of settling apparatus now in common use.

My invention consists of an upright tank or vessel in which are four different spaces each having a different function. These spaces are the inflow space, the settling space, the underflow space (or thickened pulp space) and the solution overflow space. The tank is divided laterally, i. e. in horizontal section or plan, into two spaces, the inflow space and the space occupied by the underflow, settling, and overflow spaces, which are superimposed one above another, the underflow space at the bottom, the settling space in the middle, and the overflow space at the top. Relatively dilute pulp to be settled is fed to the inflow space from which it flows into the settling space, the separation of clear (or relatively clear) solution and thickened, or relatively concentrated, pulp takes place in the settling area, the clear solution flowing upward into the overflow space and the thickened pulp passing downward into the underflow space, clear (or relatively clear) solution overflows from the overflow space, and thickened or relatively concentrated pulp is discharged from the underflow space. The settling space is divided into a number of similar sloping settling spaces by a number of similarly placed sloping plates or partitions. These partitions are preferably parallel in the straight line type of apparatus and are preferably symmetrically placed about the central vertical axis in the circular or annular type of machine. The upper edges of the plates are all approximately on the same upper level and the lower edges are all on approximately the same lower level, so that all of the sloping settling spaces formed between these plates open at their upper ends, at practically the same level, into the upper or overflow space of the tank and all of the lower ends of these settling spaces open at practically the same lower level into the lower underflow or thickened slime space. These sloping settling spaces are closed on the sides by walls of the vessel except at one (or both if desired) side of the lower part of these spaces they open into the inflow division of the tank. By this arrangement I am able to secure a very large settling surface in a comparatively small volume and a very efficient settling action as the flow of dilute pulp and of thickened pulp do not interfere with each other in any way.

The accompanying drawings show several different arrangements of my invention and make clear the following detailed description of the apparatus and the manner of its operation.

Fig. I shows a vertical section on a diameter of a circular form of my invention.

Fig. II shows a plan view and Fig. III a side elevation of the circular form of my apparatus.

Fig. IV shows a plan view of the rectangular or straightline form of my invention.

Fig. VI shows a vertical section on the line A—A and Fig. V a sloping section on the lines B—B.

Fig. VII shows a sloping section similar to that in Fig. VI, of a form of the invention having a settling space on both sides of the inflow space.

Fig. VIII shows a plan view of the annular form of the invention.

Fig. IX shows a vertical section on the line c—c of Fig. VIII.

Fig. X shows a sloping section along the line D—D of Fig. VIII.

Fig. XI shows a sloping section similar to Fig. X of an annular form of the invention, having a settling space on both sides of the inflow space.

Fig. XII shows some modifications of the general form of the apparatus.

Figs. I, II and III show the circular form of the apparatus, as previously noted, the apparatus is divided into four parts, the central inflow space (1) which is separated from the surrounding settling space (2) by the cylinder (5). Beneath or closing the bottom of the inflow space (1) a horizontal deflecting plate (6) is placed, leaving an annular opening (7) between it and the cylinder (5). Beneath the inflow space (1) and settling space (2) in the bottom of the circular enclosing tank (8) is the underflow space (3) which is preferably hoppered as indicated. In the upper part of the tank above the settling space (2) is the overflow space (4). In the settling space (2) are a number of similarly placed sloping preferably plane surfaces (10), the upper edges (9) of which are approximately level with each other and approximately in the same horizontal plane which is preferably at the bottom of the outflow space (4) and the lower edges (11) of which are preferably level and may be approximately in the same horizontal plane which is on the same level with the deflecting plate (6) or preferably somewhat beneath this level. The inside lateral edges (12) of the surfaces (10) join the central cylinder (along a helical line) and the outside edges (13) of these settling planes join the outside shell of the enclosing circular tank (forming a helical line of contact). The plates or surfaces (10) divide the settling space (2) into a number of similar sloping settling spaces (17) which open into the overflow space (4) at their upper parts and into the underflow space (3) at their lower parts. The clear solution overflows from the overflow space (4) through the overflow pipes or launders (14) and the thickened slimes are discharged from the bottom of the underflow space (3) through the outlet pipe (15).

The operation of the apparatus is as follows: Relatively dilute pulp is fed to the inflow space (1) through the pipe or launder (16) and flows down inside the cylinder (5) and is deflected laterally at the bottom of the inflow space (1) by the bottom or deflecting plate (6) and flows laterally out between the settling surfaces (10) in the settling space (2) into the similar settling spaces (17) in which the settling out of the suspended solids takes place. After being distributed laterally from the opening (7) the pulp flows upward in the settling spaces (17) and solids settle toward the upper surface of the plates (10) at the lower surface of the settling spaces (17) and the thickened pulp thus formed flows down into the underflow space (3) and is discharged at (15). The clear solution above the settled pulp in the settling spaces (17) flows upward along the upper part of the spaces (17) beneath the surfaces (10) and passes out into the overflow space (4) and is discharged through the overflow pipes or launders (14). As will be noted, the flow of dilute pulp and of the thickened pulp and of the clear solution are all such that there is no mixing or interference between any of them, thus giving the best possible conditions for the settling of the solids and separation of clear solution. It will also be seen that by this arrangement of the apparatus a very large settling surface may be secured in a comparatively small volume, since the settling and dividing surfaces (10) may be comparatively close together. The slope of the settling surfaces (10) should be sufficient that the settled slimes or thickened pulp will flow freely on them so as to avoid excessive building up thereon of a solid slime cake. In order to prevent the gradual building up of a solid layer of slime on the plates (10), which will occur even on steeply sloping surfaces (as for example building up of a solid layer of slime which occurs even on the vertical sides of a pachuca slime agitator), due to the adhesion of the solid particles to the surface and to each other, a scraping device may be used in my apparatus to move down the upper surface of these plates (10) at intervals and scrape off the adhering layer of slime. This device consists of scraper (20) attached to the lower end of a long curved arm (21) which is attached at its upper end by a pivot joint to the outer end of the arm (21). The arm (22) is arranged to move forward and backward through the arc of a circle and at the same time up and down on the central shaft (19), the two motions being so timed and proportioned that the scraper (20) is pushed and drawn slowly down and up the upper or settling surface of the plates (10). Such a scraper (20) and arms may be used for each settling surface (10) but a single scraper may also be used for all the surfaces (since the building up of the cake occurs so slowly that only an occasional scraping is necessary) by arranging the device so that it may be moved around the circle so as to scrape one settling plate after another in succession around the circle.

In order to keep the settled slimes in the underflow space (3) in a fluid condition and to prevent packing, and to secure a uniform discharge of the thickened pulp, stirring arms (18) attached to the central shaft (19) and caused to rotate slowly near the bottom of the settled pulp, may be used to advantage in cases in which a thick discharge is desired. This device is not in any sense a plow or scraper to draw the pulp to the center but is merely a stirrer to maintain the settled pulp in a uniform fluid condition.

The straight line forms of my invention shown in Figs. IV, V, VI and VII have some advantages in construction over the circular form in that the planes or settling surfaces (10ª) are rectangular in shape and may be placed in the tank or removed therefrom without any difficulty. The scraper device (20ª and 21ª) which may be used in this case to prevent the building up of a cake on the settling surfaces (10ª) is also somewhat simpler than that in the circular machine since the movement is in a straight line. As noted in the previous case, a set of scrapers, i. e., a scraper for each surface (10ª) may be used, or a single scraper may be arranged to pass from one surface to another, and so scrape all the settling surfaces successively at suitable intervals. As will be seen from the drawings the principle and operation of the straight line machine is similar to that of the circular machine, the only difference being in the shape and arrangement of the various parts. The manner of operation is the same in each case. The dilute pulp enters the rectangular inflow space (1ª) through the pipes or launders (16ª) and flows down this space and is deflected by the bottom of the space or deflecting plate (6ª) and flows laterally out into the settling spaces (17ª) between the settling plates or partitions (10ᵉ) and in these spaces the slimes settle out and flow downward along the slope on top of the plates (10ª) to the underflow space (3ª) beneath the settling space and the clear solution flows upward along the slope beneath the settling surfaces (10ª) into the overflow space (4ª) above the settling area. The thickened slimes in the underflow space (3ª) may be stirred to keep them in a uniform fluid condition by means of a suitable stirring device (18ª) Fig. VII arranged to move slowly in the pulp in the lower part of the outflow space (3ª). The thickened pulp is discharged from the underflow space (3ª) by suitable pumps or valves through the outlet (15ª). The clear solution is discharged from the overflow space through the overflow pipes (14ª). Fig. VII shows a section of a double type of the straight line apparatus in which a single rectangular inflow space is placed between two settling spaces (2ª) one on each side with a common outflow or thickened slime space (3ª)

beneath. In this case a single inflow space serves for the double settling apparatus.

The annular type of my apparatus shown in Figs. VIII, IX and X differs only from the circular type in that the inflow space (1$^b$) inside (or if desired outside and surrounding) the settling space is made annular in shape. In this case the dilute pulp is preferably fed into the inflow space (1$^b$) through the launder or pipe (16$^b$) which receives its supply of pulp at the center and revolves with the central shaft (19$^b$), which also moves the stirring device (18$^b$), and the inflowing pulp is thus distributed uniformly to all parts of the inflow space (1$^b$). The double annular type of my invention shown in Fig. XI is similar to the single annular apparatus except that the single annular inflow space (1$^b$) serves two annular settling spaces (2$^b$) surrounding the single inflow space (1$^b$).

Fig. XII shows some modifications which might be used in the construction of my apparatus none of which arrangements are preferred. As will be noted in this figure, the overflow space may be placed at one side of the upper part of the settling spaces in the form of a launder (4$^c$), but this is not my preferred method, since a more uniform flow of solution through the settling spaces may be secured by having a common outflow space above the settling space from which the clear solution is withdrawn by suitably spaced overflow pipes (14$^c$). As will also be noted, the inflow space (1$^c$) may be constructed and placed near the bottom of the settling planes, and this space be fed through the pipe (16$^c$), but my preferred arrangement is that shown in the other figures.

Corresponding numerals with different letters or exponents indicate similar parts of the apparatus in different forms of the invention. For example (1), (1$^a$), (1$^b$) and (1$^c$) refer to similar or corresponding parts in different forms of the invention.

It should be noted that the apparatus should be designed for any particular case so that there will be sufficient volume in the settling space that the velocity of flow will not be too great, and also so that sufficient time will be allowed for the flocculation of the slimes which must occur in many cases before settlement takes place. The volume of the underflow space should also be sufficient to allow sufficient time for any desired thickening of the settled slime. It should particularly be noted in this connection that if the settling surfaces (10) are extended below the deflection plate (6) into the underflow or thickening space (3), the separation of the solution from the pulp during thickening will be greatly facilitated and the thickening hastened. The action in this case being somewhat similar to that in the settling space, the solution finding it easier to escape from the pulp by flowing upward beneath the separating surfaces (10) than if these are not present. By the use of these sloping surfaces in the thickening or underflow space (3) the time necessary for thickening, and therefore the volume required may be much reduced.

From the foregoing it will be seen that by means of my invention solids may be separated from relatively dilute pulps in a very small volume as compared with the volume required in the apparatus now generally used for this purpose. It should be particularly noted in this connection that not only is the volume required in my apparatus intrinsically very small, but that the apparatus may be elongated vertically thus greatly reducing the horizontal space required, which is an item of great importance in a settling apparatus.

The great many applications of my invention in the treatment of various kinds of slime pulp in the chemical and metallurgical fields, and in the handling of sewage as well as in other fields, will be apparent to all engineers engaged in this kind of work. The compactness of the apparatus makes it especially suitable for counter current treatment of slimes with solutions. For this purpose a series of machines may be used as is done with the ordinary settling devices now used, or if desired, the circular or annular type of my apparatus may be divided into a number of separate parts, each acting as a single machine, and connected in series by means of suitable pipes and pumps in a manner similar to that used with a series of single machines. In many cases the use of diaphragm pumps for the pumping of slimes from one to another of the series of my settlers, will be unnecessary since the apparatus is so compact and the series may be so closely grouped that the slimes may be made to flow by gravity from one to another of the settlers.

It will be apparent that it is not possible, in the scope of a patent application, to describe or figure all the possible minor variations in the construction and operation of my apparatus, and I do not, therefore, desire to be limited entirely by the foregoing, but by the claims appended hereto.

Having described my invention, what I claim is:

1. In an apparatus for the settlement of solids suspended in liquid, the combination of a container having suspended therein a number of similar parallel sloping settling surfaces separated by similar settling spaces, said settling spaces opening at their upper ends into an overflow space arranged to allow an overflow of clarified liquid, and said settling spaces opening at their lower ends into a discharge space arranged to receive settled solids and to discharge said solids therefrom, and each of said settling spaces opening in a lower part of a side thereof into a supply container arranged to allow a lateral inflow of the suspension to be settled into said settling spaces.

2. In an apparatus for the settlement of solids suspended in liquid, the combination of a container having suspended therein a number of similar parallel sloping settling surfaces separated by similar settling spaces, said settling spaces opening at their upper ends into an overflow space arranged to allow an overflow of clarified liquid, and said settling spaces opening at their lower ends into a discharge space arranged to receive settled solids and to discharge said solids therefrom, and each of said settling spaces opening in a lower part of a side thereof into a supply container arranged to allow a lateral inflow of the suspension to be settled into said settling spaces, all arranged so that when such above said suspension is supplied to said supply container, said suspension will flow from said container laterally into said settling spaces and upward along the slope of said settling spaces and clarified liquid will be discharged from said settling spaces into said upper overflow space and settled solids will flow down said settling surfaces and be discharged from the lower ends thereof into said discharge space.

3. In an apparatus for the settlement of solids suspended in liquid, the combination of a number of similar parallel sloping settling spaces separated by sloping settling surfaces and arranged to receive a lateral inflow in the lower portion thereof of suspension to be settled and to discharge clarified liquid from the upper end thereof and settled solids from the lower end thereof.

4. The method of separating solids suspended in liquid, which consists in causing a lateral inflow of the liquid carrying the material in suspension into the lower end of a multiplicity of similar parallel sloping settling spaces formed by a number of sloping settling surfaces, and causing an upward flow of the liquid along the slope of said settling spaces whereby a discharge of the clarified liquid from the upper ends of the settling spaces is obtained and a downward flow of settled solids along the slope of said settling surfaces and a discharge of said settled solids from the bottom of said settling spaces is effected.

In testimony whereof I have signed my name to this specification.

NIELS C. CHRISTENSEN.